US005258090A

United States Patent [19]

Becker et al.

[11] Patent Number: 5,258,090

[45] Date of Patent: Nov. 2, 1993

[54] HAND-HELD PORTABLE LABELLING DEVICE AND THE INKING ROLLER MOUNTING THEREFOR

[75] Inventors: Werner Becker, Hirschhorn/N; Heinrich Volk, Beerfelden, both of Fed. Rep. of Germany

[73] Assignee: Esselte Meto International Produktions GmbH, Hirschhorn, Fed. Rep. of Germany

[21] Appl. No.: 978,902

[22] Filed: Nov. 19, 1992

[30] Foreign Application Priority Data

Dec. 14, 1991 [DE] Fed. Rep. of Germany ....... 4141298

[51] Int. Cl.[5] .............................................. B32B 31/00

[52] U.S. Cl. .................................... 156/384; 101/288; 156/540; 156/541

[58] Field of Search ............... 156/384, 387, DIG. 49, 156/540, 541; 101/288

[56] References Cited

U.S. PATENT DOCUMENTS

| | | | |
|---|---|---|---|
| 4,094,724 | 6/1978 | Sato | 156/384 |
| 4,301,729 | 11/1981 | Fujita | 101/291 |
| 4,406,727 | 9/1983 | Fujita | 156/384 |
| 4,793,889 | 12/1988 | Becker | 156/384 |

FOREIGN PATENT DOCUMENTS

| | | |
|---|---|---|
| 2857834 | 3/1979 | Fed. Rep. of Germany . |
| 3141597 | 5/1982 | Fed. Rep. of Germany . |

*Primary Examiner*—David A. Simmons
*Assistant Examiner*—Paul M. Rivard
*Attorney, Agent, or Firm*—Nils H. Ljungman

[57] ABSTRACT

A manual, or hand-held labelling device has a printing apparatus and a pivoting lever on which pivoting lever there is a journal pivot pin on which an inking roller can be loosely mounted. For axially securing the inking roller on the journal pivot pin, within the housing of the manual labelling device, there can be at least one raised, guide track in the form of a circular arc, on the housing of the labelling device, and on the side opposite to the pivoting lever. This guide track essentially corresponds to the path of the inking roller on the pivoting lever as the pivoting lever is moved during a labelling operation, and thus supports the inking roller from moving axially off of the pivot pin during movement of the pivoting lever during the labelling operation.

20 Claims, 3 Drawing Sheets 1
2
3
4
5
6
7
8
9
9a
10
11
12
20
21
23
25
26
A
A

HAND-HELD PORTABLE LABELLING DEVICE AND THE INKING ROLLER MOUNTING THEREFOR

BACKGROUND INFORMATION

1. Field of the Invention

This invention relates to a hand-held, portable labelling device having a printing apparatus and an inking roller loosely mounted on a journal pivot pin of a pivoting lever. Upon activation of the labelling device, the inking roller inks the printing apparatus and, during the inking procedure, the inking roller, along with the pivoting lever to which it is mounted, is moved out of its idle position by the printing apparatus. The pivoting lever and inking roller are returned to the idle position by the force of a spring acting thereon.

2. Background Information

One such manual labelling device is disclosed in German Patent No. 28 57 834 C2. In this manual labelling device, there is an elastic retaining element in the shape of a circular arc, for axially securing the inking roller on the journal pivot pin. The elastic retaining element engages a groove on the end of the inking roller. As the pivoting lever moves back-and-forth during a labelling cycle, the groove on the inking roller moves along this retaining element, so that the inking roller cannot be displaced axially. The inking roller is thus prevented from sliding off the journal pivot pin. To change the inking roller, the retaining element is raised out of the groove, against the force of a spring, thus allowing the inking roller to be axially removed from the journal pivot pin, and replaced by a new inking roller.

One serious disadvantage of the arrangement described above is that very strict requirements are necessary for precise manufacturing of the retaining element In this regard, the shape of the retaining element must essentially correspond exactly to the circular arc executed by the inking roller in its back-and-forth movement. The inking roller must also essentially be positioned precisely on this circular arc in its idle position, which is naturally quite difficult with such spring-loaded configurations. If these requirements are not completely satisfied, problems and malfunctions will almost inevitably occur in the manual labelling device. For example, the pivoting lever with the inking roller can jam on the retaining element. Also, the retaining element may not always be engaged with the groove of the inking roller, in which instance the inking roller may slide axially off the journal pivot pin or, even more likely, the inking roller can become jammed laterally next to the groove underneath the retaining element.

In addition to these functional disadvantages on known inking roller mountings, it is usually very unfavorable that the inking roller itself must have a groove which matches the inking roller mounting. This particular configuration of the inking roller naturally results in higher costs for the manufacture of such a roller. Further, since such rollers are subject to wear and have to be replaced regularly, such rollers are therefore a relatively expensive disposable piece. Moreover, such a configuration of the inking roller also tends to make the inking roller asymmetrical, so that while the labelling device is being operated, the operator is forced to worry about the proper orientation of the device. Furthermore, this known configuration also takes up additional space in the axial direction, because the inking roller cannot perform the task for which it is intended in the vicinity of the groove, namely the inking of the printing apparatus. Thus, a roller assembly having such a groove needs to be wider than a roller assembly which would not require such a groove, and therefore, the entire manual labelling device needs to be made wider and heavier.

OBJECT OF THE INVENTION

The object of the invention is to design a manual labelling device of the type indicated above to have an inking roller mounting in which the inking roller is securely held on the journal pivot pin, and in which the inking roller itself does not need to have any special shape for engagement with retaining elements. An additional object of the invention is to be able to use an inking roller which is usable over essentially its entire width.

SUMMARY OF THE INVENTION

The above objects are achieved in a manual labelling device having, inside the housing thereof, and opposite the free end of the journal pivot pin, at least one raised, arc-shaped guide track, against which the inking roller can be axially braced. This arc-shaped guide path should preferably correspond to the swivel path, or trajectory of the inking roller mounted on the pivoting lever, as the pivoting lever pivots back-and-forth during a labelling operation. This swivel path, or trajectory is essentially the translational movement of the inking roller with respect to the housing, as opposed to the rotational movement which the inking roller also undergoes. Thus, as a result of the guide track, there need not be any retaining mechanism either on the pivoting lever or on the inking roller. Any extensive axial movement of the inking roller on the journal pivot pin in a direction away from the pivoting lever is thereby essentially prevented because the inking roller is configured to run into the guide track. Even in this case, however, the contact with the guide track is only slight. Otherwise, the inking roller turns on the journal pivot pin, completely free of any holding elements.

In a configuration with a particularly simple design, the guide track can preferably be applied directly as a web or raised surface on the inside of one wall of the housing. The guide track can thus simultaneously be a part of the reinforcement ribbing of the inside wall of the housing, which reinforcement ribbing is generally necessary in such a device. In such an embodiment, there could, therefore, essentially be no additional costs at all for the inclusion of a guide track.

To minimize the friction between the guide track and the inking roller, it is appropriate to locate the guide track eccentrically with respect to the journal pivot pin. Preferably, the guide track should therefore be located in a position between the pivot point of the pivoting lever and the midpoint of the journal pivot pin. When in contact with the guide track, the inking roller would then roll with its normal rotation, as caused by the printing apparatus, even when the inking roller is in contact with the guide track, so that there is essentially no friction or only minimum friction.

In one embodiment of a manual labelling device, replacement of the inking roller is essentially very simple if, in the housing wall on the side of the labelling device, opposite the mounting of the journal pivot pin on the pivoting lever, there is an opening which is preferably bridged by the guide track. In this configuration, the guide track is preferably designed to have a movable portion, at least in the vicinity of the opening. Thus, to replace the inking roller, the opening can be completely exposed, or opened, and the inking roller can be pulled off the journal pivot pin, through the opening. A replacement roller can then be inserted back over the journal pivot pin, and the opening can be closed. So that the guide track need not be designed as a separate component, in this configuration there can be a movable closure for the opening, on the inside of which closure there can preferably be a first segment of the guide track which connects directly to a second segment of the guide track, formed on the inside of the housing wall, when the closure part is inserted into the opening. Such a closure can be advantageously designed as a pivoting flap, which can be mounted so that it can rotate on the housing wall, and can then be pivoted into the opening parallel to the housing wall. Such an opening should preferably be located opposite the rest position of the journal pivot pin, so that the inking roller is free of the printing mechanism during the replacement operation, and so that the pivoting lever does not first need to be pivoted toward the opening before the roller can be removed.

Another embodiment of the labelling device according to the present invention also allows for an essentially simple replacement of the inking roller. In this embodiment, to replace the inking roller, the pivoting lever can be pivoted forward against the force of a spring, beyond its normal pivot distance caused by the printing apparatus, and out of the housing. During normal operation of the manual labelling device, the pivoting lever generally moves only within the vicinity of the guide track, so that the inking roller is effectively secured against axial slippage. To replace the inking roller, the pivoting lever then essentially only needs to be pushed forward manually and pivoted out of the manual labelling device. This extra pivot essentially places the inking roller in a position which is particularly easily accessible and which also allows the inking roller to be moved axially for replacement. Thus, essentially no additional moving parts are thereby required for the realization of the labelling device of the present invention.

A further simplification of the overall inking roller mounting can be achieved if the pivoting lever is constructed from a leaf spring which is braced in a fixed manner on one side of the labelling device, and which leaf spring preferably has pivots formed directly thereon.

One aspect of the invention resides broadly in a hand-held, portable labelling device for printing labels. The labelling device comprises a housing, a printing apparatus disposed in the housing for printing on a label to produce a printed label, the printing apparatus being movable in a direction towards and away from the label, a device for supplying labels to the printing apparatus, and a device for applying ink to the printing apparatus. The device for applying ink comprises a lever having a first end and a second end, a pivot pin disposed on the first end of the lever, with the pivot pin having a first end attached to the first end of the lever and a second end disposed away from the first end of the lever, an inking device for applying ink to the printing apparatus, with the inking device being slidably disposed on the pivot pin to rotate thereabout. The lever is pivotably mounted in the housing for movement of the inking device along a first path of travel, and the housing comprises at least one raised surface disposed in the housing at least along the first path of travel. The at least one raised surface is disposed adjacent the second end of the pivot pin and the at least one raised surface is configured for retaining the inking device on the pivot pin as the inking device means moves along the first path.

BRIEF DESCRIPTION OF THE DRAWINGS

Additional advantages of the present invention are illustrated in the following description of the invention, with reference to the accompanying drawings, in which.

DESCRIPTION OF THE PREFERRED EMBODIMENTS

Figure 1:
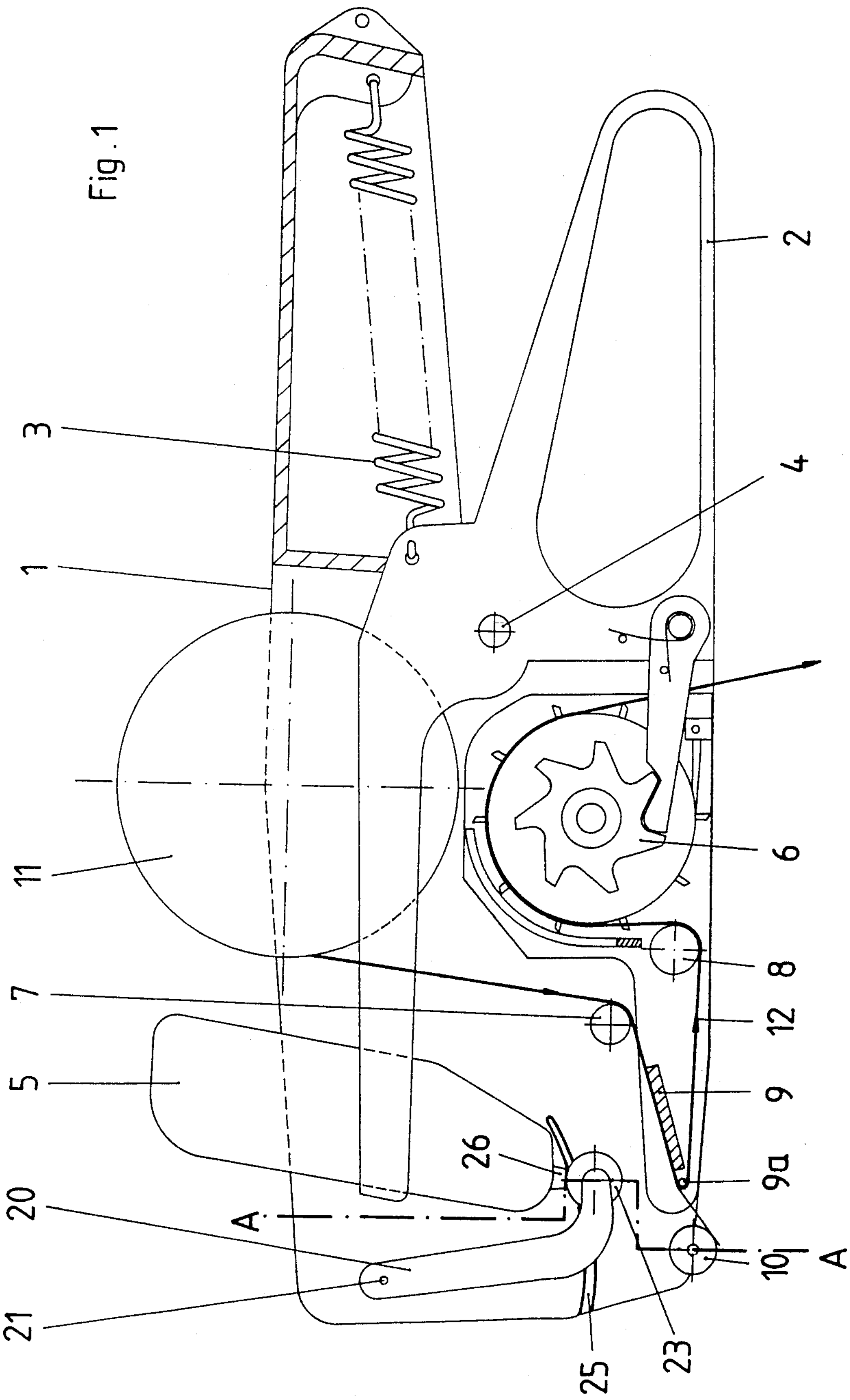
FIG. 1 is a schematic illustration of a manual labelling device open on an end thereof, and having the inking roller mounting according to the present invention.

FIG. 1 is a schematic illustration of a hand-held, portable labelling device with an open housing 1. Such an open housing could essentially have an opening along the top portion, and also along the left hand side of the housing as shown in FIG. 1. In the housing 1, an activation lever 2 can be mounted to pivot around a pivot 4 against the force of a spring 3. A printing device 5 can be fastened to the activation lever 2 at an end thereof opposite the handle portion.

In the lower portion of the housing 1 there can preferably be a drive mechanism 6, which can be interactively connected to the activation lever 2. Also located in the lower portion of the housing 1, there can preferably be deflector rollers 7 and 8, as well as a printing pad 9, an integrated dispenser edge **9*a* and an applicator roller 10**.

In the upper portion of the housing 1, a label strip roller 11 can be mounted so that it can rotate. From this label strip roller 11, a strip of labels disposed on a peel-away backing can be guided along a line 12, (marked with arrows), through the manual labelling device. This path through the manual labelling device can generally lead around the deflector roller 7, over the printing pad 9, around the dispenser edge **9*a*, and around the deflector roller 8 to the drive apparatus 6**.

Figure 2:
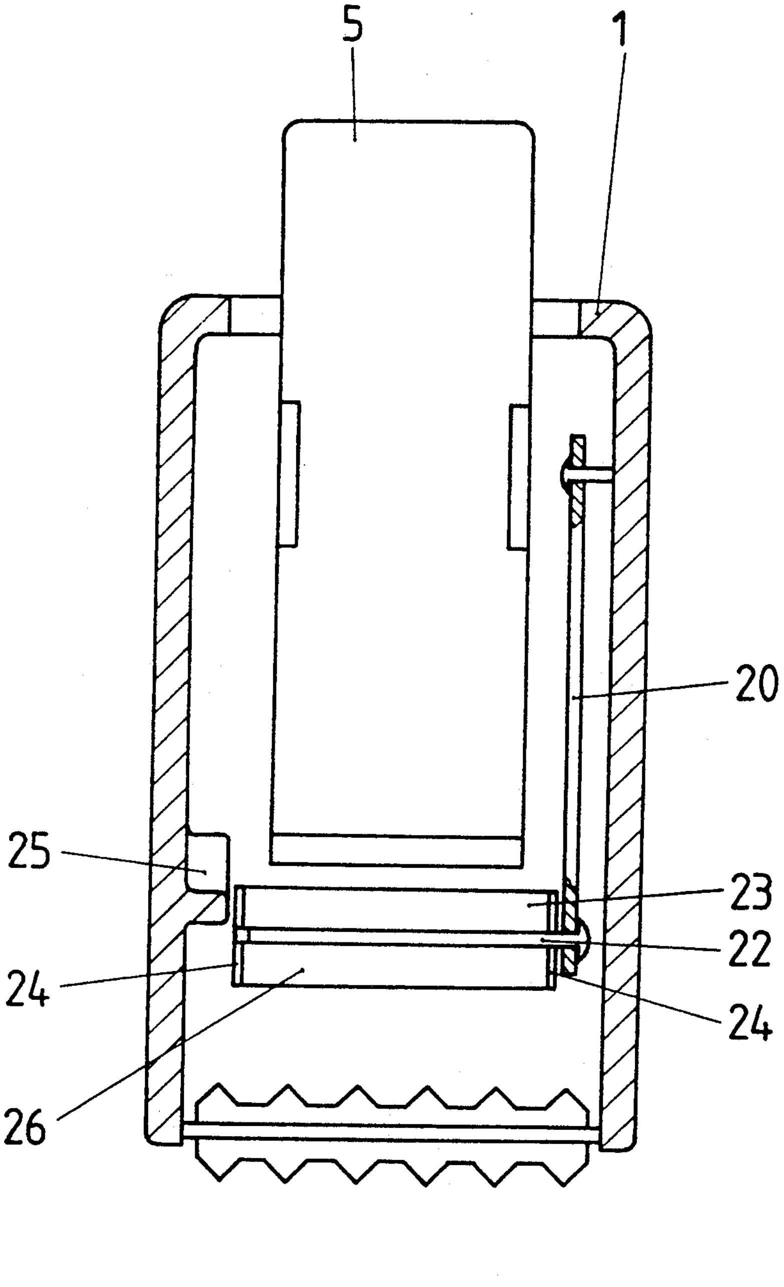
FIG. 2 shows a cross section along Line II—II in FIG. 1.

In the front part of the housing, (on the left-hand side in FIG. 1), there can be mounted a pivoting lever 20, which can rotate, or pivot, with its one end, around a point 21. On its other end, the pivoting lever 20, as shown in FIG. 2, can have a journal pin 22 pointing across the housing toward the opposite side. An inking roller 23 can be disposed on the journal pivot pin 22 to rotate thereabout. The actual inking body 26 of the inking roller may be limited by two integrated flanged discs 24 disposed one on each end thereof.

On the rear wall of the housing, guide track 25, preferably in the shape of a cicular arc, is preferably formed. As shown in FIG. 2, this guide track 25 can be formed as a web, or raised portion, directly on the housing. The arc of this guide track 25 should preferably run concentrically with respect to the pivot point 21 of the pivoting lever 20, as shown in FIG. 1, and should be located approximately above the central point of an axial end of the inking roller 23. This guide track 25 can preferably lead from the forward, open end of the housing 1 (to the left in FIG. 1), at least approximately over the normal pivoting distance of the pivoting lever 20, toward the rear, (to the right in FIG. 1). On the forward, open end of the housing, the guide track preferably leads diagonally toward the rear.

In other words, the arc described by the guide track 25 should preferably be defined by a central point corresponding essentially to the pivot pin 21. Also, preferably, as shown clearly in FIG. 1, the guide track 25 should not be configured to directly face the midpoint, or rotational center, of the inking roller 23, but should be disposed above, or even below the rotational center.

The printing apparatus 5, on an end thereof in the vicinity of the inking roller 23, generally can have printing type 26. One mode of operation of the manual labelling device can therefore be described as follows, with reference to FIG. 1. When the hand lever 2 is activated, it is pivoted counterclockwise against the force of the spring 3. The printing apparatus 5 is thus moved downward, and the printing type 26 comes into initial contact with the inking roller 23. On account of the force acting on the inking roller 23, a torque in the clockwise direction is thereby exerted on the pivoting lever 20, so that the latter moves forward, whereby the inking roller rolls against the printing type 26 and inks it. After the pivoting lever 20 has pivoted far enough, the printing apparatus 5 is moved past the inking roller 23 to the printing table, or pad 9, whereupon the label strip is stamped. During this phase, the inking roller 23 can preferably be braced against the housing of the printing apparatus by means of its flanged discs 24.

The return movement the hand lever 2 during a cycle of operation of the labelling device is caused by the spring 3, while, at the same time, the drive apparatus 6 advances the label strip forward by preferably one transport step. The label strip is thereby pulled over the dispenser edge 9*a*, where one label is released from the backing strip and is transported under the pressure roller 10. The label can thus be applied or glued to the item to be labelled. During this return movement, the load is removed from the pivoting lever 20, and the pivoting lever can thus return, by means of a spring, (not shown}, to the indicated starting, or idle position.

During the movement of the pivoting lever 20, the inking roller can essentially rotate on the journal pivot pin 22 in both a clockwise direction and a counterclockwise direction. In the event of disruptions, such as vibrations, the manual labelling device being held in a tilted position, etc., the inking roller would normally attempt to slide axially on the journal pivot pin 22. However, the inking roller 23 is essentially directly prevented from sliding, on the one end (to the right in FIG. 2), by the end of the pivoting lever 20 itself, and on the other end, (to the left in FIG. 2), by encountering the guide track 25 according to the present invention and being deflected thereby. Thus, the sliding of the inking roller 23 on the journal pivot pin 22 can be maintained at a minimum. Any extensive axial slipping of the inking roller 23 on the journal pivot pin is thus prevented in an extremely simple manner, without the need for special fastening means.

The labelling device according to the present invention also allows the replacement of the inking roller to be a particularly simple operation. In a first embodiment of the labelling device, the pivoting lever 20 can be pivoted forward, beyond its normal operating distance, out of the manual labelling device. Then the journal pivot pin 22 is essentially completely exposed on one side, and if the manual labelling device is tilted over a disposal container, for example, the inking roller can be allowed to slide directly off of the journal pivot pin 22 into a disposal container. Then, essentially all that is necessary to install the new roller is to tilt the manual labelling device in the opposite direction and insert a new inking roller 23 onto the journal pivot pin 22, and then to release the pivoting lever 20 to move back into the labelling device. The pivoting lever 20 can immediately be pulled back into the housing 1 by means of a resilient member, such as a spring (not shown), so that the new inking roller 23 is once again secured in its axial direction. When the inking roller assembly, that is, the inking roller 23 and pivot arm 20, moves back into the labelling device, a bevel in the forward portion of the guide track 25 can reliably prevent jamming or sticking of the inking roller assembly.

Figure 3:
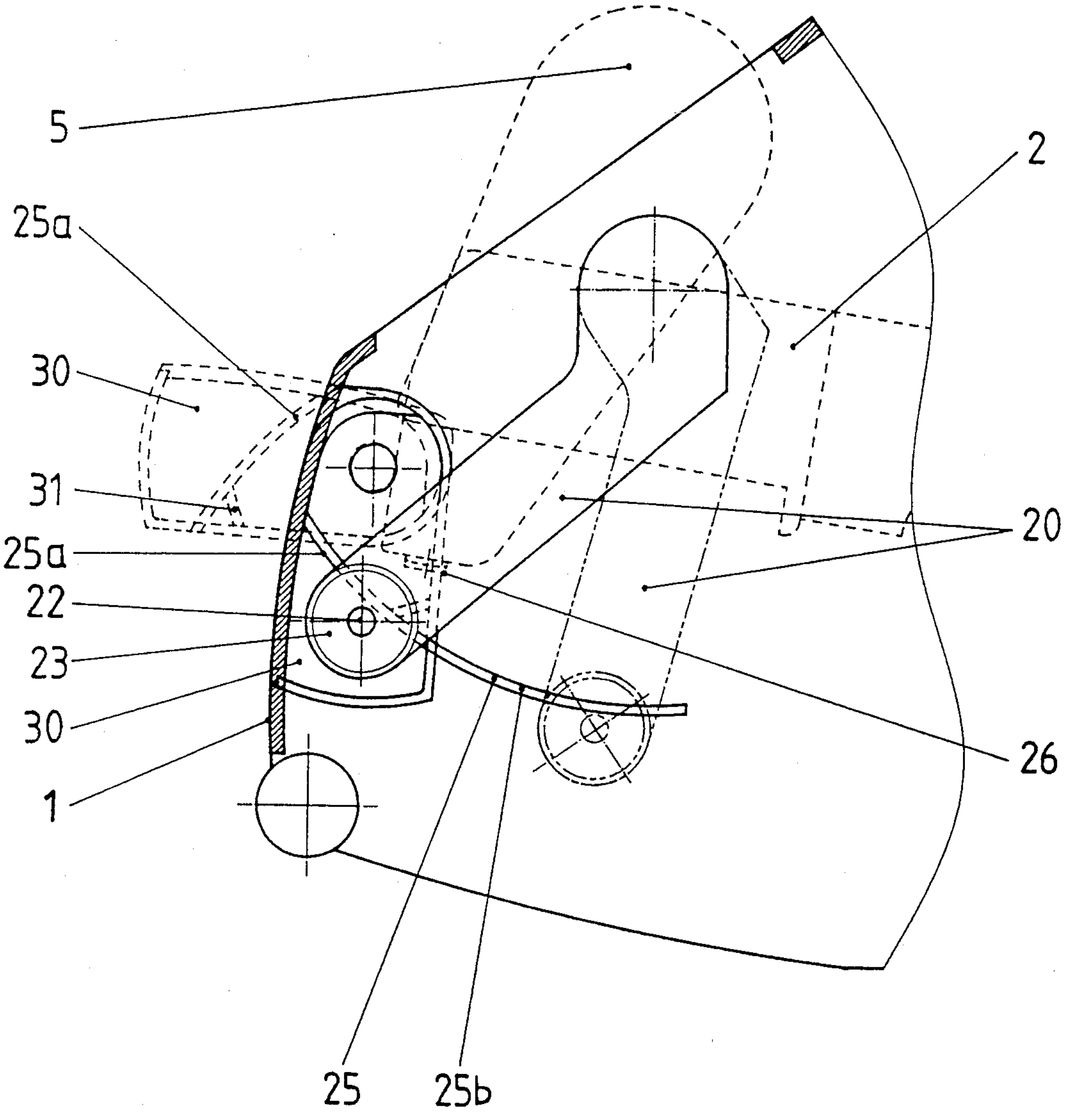
FIG. 3 shows a detail of an additional manual labelling device from the side, with a closure which can be pivoted away from the housing.

FIG. 3 illustrates an additional embodiment of the invention, in which parts which are essentially similar to the parts of the embodiment illustrated in FIGS. 1 and 2 are identified with the same reference numbers. In FIG. 3, however, only the forward portion of the manual labelling device is essentially shown, with the ink roller mounting which is of interest here. One significant difference from the embodiment illustrated in FIGS. 1 and 2 is that the manual labelling device illustrated in FIG. 3 can have a housing which is closed in front. As will be discussed below, the embodiment of FIG. 3 essentially illustrates that even if the housing is closed in front, it is possible to easily change the inking roller.

The embodiment of the manual labelling machine shown in FIG. 3 has a flap, or cover 30 which can be pivoted toward and away from the side wall of the housing 1. This flap 30, in a closed position, normally closes an opening which is opposite the free journal pivot pin 22, when the journal pivot pin 22 is in the rest position of the pivoting lever 20. This rest position of the pivoting lever 20 is shown by a solid line in the drawing. Both the forward portion of the activation lever 2 and the printing apparatus 5, fastened to it, are shown in dotted lines, for the sake of greater clarity. In this rest position, there can be a space between the printing apparatus 5 and the inking roller 23. Only when the printing apparatus 5 moves downward does the printing type 26 come into contact with the inking roller 23 and push the pivoting lever 20 downward, (to the right in FIG. 3). The pivoting lever 20 thus reaches the position represented by the dotted line.

The inking roller 23 moves along the guide track 25, which, in this embodiment, is divided into two segments 25*a* and 25*b*. The segment 25*a* is preferably located on the inside of the flap 30 and can thus be swung away with the flap 30 in a direction parallel to the side wall of the housing. The swung-out position of the flap 30 is shown by dotted lines. In addition to this first segment 25*a* of the guide track 25, which moves with the flap 30 when the flap is in the closed position, there is also preferably the second segment 25*b* which, similar to the embodiments illustrated in FIGS. 1 and 2, can be designed as a web on the inside of the housing. This segment 25*b* is for being connected to the segment 25*a* when the flap 30 is in the closed position, to thereby form an essentially continuous, uninterrupted guide track 25.

As the flap 30 closes, the first segment 25*a* of the guide track 25 moves, for the most part, transversely with respect to the inking roller 23. There can also preferably be a lead-in, or guide web segment 31, similar to the guide track 25, which runs diagonal to the first segment 25*a* of the guide track 25, (In FIG. 3, this segment 31 essentially is disposed to run towards the right, or rear of the labelling device. This segment 31 is preferably inclined from a surface of the flap up to the guide segment 25*a*. Thus, when the flap is closed, this guide web 31 essentially engages behind the inking roller, and with its inclined surface, moves the inking roller axially, until the inking roller rests against the guide track segment 25*a*.

The two segments 25*a* and 26*b* of the guide track 25 can preferably be designed so that their adjoining edges which contact one another when the flap 30 is closed are bevelled toward the rear of the labelling device. Thus, during replacement of the inking roller, the two segments essentially do not interfere with one another in such a way as to hinder the opening and closing of the flap 30.

In the embodiment illustrated in FIG. 3, the replacement of the inking roller 23 is essentially even simpler than the replacement of the inking roller 23 in the previously discussed embodiment of FIGS. 1 and 2, because with the configuration of FIG. 3, it is not necessary to move any part which is under spring tension. Essentially all that is necessary is to open the flap 30 into the position indicated by the dotted line. The old inking roller 23 can then simply be slid out, or allowed to slide out on its own if the manual labelling device is held at an angle so that the inking roller 23 slides off of the journal pin 22 under the influence of gravity. In this idle position, the inking roller is essentially completely free of the printing apparatus 5. To then insert a new inking roller 23, essentially all that is necessary is to tilt the manual labelling device to the other side so that it is possible to simply let a new inking roller 23 slide through the opening onto the empty journal pivot pin 22. If the inking roller does not get completely into its final position, it can be securely pushed into this final position, by the closing of the flap 30 by means of the lead-in web 31.

A significant advantage of the inking roller mounting according to the present invention is that the inking roller 23 itself need not have any special shape, design or configuration. Ordinarily, these inking rollers have thin flanged discs 24 on their edges, to prevent the ink they contain from flowing out the sides. There are also inking rollers on the market which have handling elements on the ends, so that the inking rollers can be grasped without getting ink on the fingers. With the manual labelling device according to the present invention, all these types of inking rollers can be used, as the customer wishes, without having to modify the inking roller mounting according to the invention.

One feature of the invention resides broadly in a manual labelling device with a printing apparatus and a pivoting lever which has a journal pivot pin, on which an inking roller can be loosely mounted, so that when the manual labelling device is activated, the pivoting lever is pushed out of its rest position by a printing apparatus and is returned by the force of a spring force, characterized by the fact that in the housing 1 of the manual labelling device, opposite the free end of the journal pivot pin 22, corresponding to the pivot path, or trajectory of the pivoting lever 20, there is at least one raised guide track 25 in the shape of a circular arc, on which the inking roller 23 can be axially supported.

Another feature of the invention resides broadly in a manual labelling device characterized by the fact that the guide track 25 is designed directly as a web molded on the inside of a housing wall.

A further feature of the invention resides broadly in a manual labelling device characterized by the fact that the guide track 25 is located eccentrically in relation to the journal pivot pin 22.

A still further feature of the invention resides broadly in a manual labelling device characterized by the fact that the guide track 25 is located between the pivot point of the pivoting lever 20 and the center of the journal pivot pin 22.

Yet another feature of the invention resides broadly in a manual labelling device characterized by the fact that opposite the journal pivot pin 22 in the housing wall, there is an opening, which is spanned by the guide track 25, whereby the guide track 25 is designed so that it moves in the vicinity of the opening, so that to change the inking roller, the opening can be completely exposed, and the old inking roller 23 can be extracted from the journal pivot pin 22 through the opening, and a new one can be inserted on it.

Another additional feature of the invention resides broadly in a manual labelling device characterized by the fact that the opening is located opposite the rest position of the journal pivot pin 22.

Another additional feature of the invention resides broadly in a manual labelling device characterized by the fact that there is a movable closure 30 for the opening, on the inside of which there is a first segment 25*a* of the guide track 25, which connects directly to a second segment 25*b* on the inside of the housing wall when the closure 30 is inserted into the opening.

Another additional feature of the invention resides broadly in a manual labelling device characterized by the fact that the closure 30 is designed as a pivoting flap 30 which is mounted so that it can rotate on the housing wall, and can pivot parallel to the housing wall into the opening.

Another additional feature of the invention resides broadly in a manual labelling device characterized by the fact that the pivoting lever 20 can be pivoted beyond its normal pivoting distance caused by the printing apparatus 5, forward out of the housing, against the force of a spring, to replace the inking roller.

Another additional feature of the invention resides broadly in a manual labelling device characterized by the fact that the pivoting lever 20 consists directly of a leaf spring which is braced in a fixed manner on one side.

Another additional feature of the invention resides broadly in a manual labelling device characterized by the fact that corresponding to the rotational movement of the flap 30, there is a lead-in web 31 which projects at an angle from the guide track 25, which runs diagonally in relation to the flap 30, so that when the flap 30 closes, the inking roller rises with an inclined plane to the guide track 25.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A hand-held, portable labelling device for printing labels, said labelling device comprising:

a housing;

printing means disposed in said housing for printing on a label to produce a printed label, said printing means being movable in a direction towards and away from the label;

means for supplying labels to said printing means;

means for applying ink to said printing means, said means for applying ink comprising:

a lever, said lever having a first end and a second end;

a pivot pin disposed on said first end of said lever, said pivot pin having a first end attached to said first end of said lever and a second end disposed away from said first end of said lever;

inking means for applying ink to said printing means, said inking means being slidably disposed on said pivot pin to rotate thereabout;

said lever being pivotably mounted in said housing for movement of said inking means along a first path of travel; and said housing comprising at least one raised surface disposed in said housing at least along said first path of travel, said at least one raised surface being disposed adjacent said second end of said pivot pin and said at least one raised surface being configured for retaining said inking means on said pivot pin as said inking means moves along said first path.

2. The labelling device according to claim 1, wherein said at least one raised surface is integrally molded with said housing.

3. The labelling device according to claim 2, wherein said inking means comprises an inking roller for rolling across said printing means to ink said printing means upon movement of said inking roller along said first path of travel, said inking roller for being slidably disposed on said pivot pin over said second end of said pivot pin towards said first end of said pivot pin.

4. The labelling device according to claim 3, wherein:

said lever, said pivot pin and said inking roller thereon have a rest position;

said labelling device additionally comprises resilient means for retaining said lever in said rest position;

said printing means displaces said inking roller and said lever from the rest position along said first path of travel upon movement of said printing means towards the label; and said resilient means returns said inking roller and said lever to the rest position along said first path of travel upon movement of said printing means away from the label.

5. The labelling device according to claim 4, wherein:

said lever is pivotably mounted to said housing at said second end of said lever;

said lever being pivotably mounted on a first side of said housing opposite the raised guide surface, said first end of said lever being pivotable along an arcuate path; and said raised guide surface comprising an arcuate surface corresponding to said arcuate path of said first end of said lever.

6. The labelling device according to claim 5, wherein:

said arcuate surface of said raised guide surface is disposed on a second side of said housing, opposite to said first side; and said arcuate surface is eccentric to said pivot pin.

7. The labelling device according to claim 6, wherein said arcuate surface of said raised guide surface is disposed in said housing eccentric to said pivot pin in a direction towards said first end of said lever.

8. The labelling device according to claim 7, wherein:

said second side of said housing comprises an opening therein adjacent the second end of said pivot pin;

at least a portion of said raised guide surface spans the opening; and said at least a portion of said raised guide surface spanning the opening being movable out of the opening to provide an unblocked opening for removal and replacement of the inking roller.

9. The labelling device according to claim 8, wherein the opening is disposed adjacent the second end of the pivot pin in said rest position.

10. The labelling device according to claim 9, wherein:

said labelling device further includes cover means for closing the opening, said cover means being removable from the opening to open the opening and replaceable in the opening to close the opening;

said cover means comprises said at least a portion of said raised guide track spanning the opening to move said at least a portion of said raised guide track out of the opening;

said raised guide track comprises at least one additional portion disposed on said second side of said housing adjacent the opening; and said at least one additional portion and said at least a portion on said cover means comprise an integral raised guide track on said second side of said housing when said opening is closed by the cover means.

11. The labelling device according to claim 10 wherein:

said cover means is pivotably mounted to said second side of said housing to pivot away from the opening to an open position to open the opening and towards the opening to a closed position to close the opening; and said cover means is pivotable about a pivot point in a direction parallel to the second side of the housing.

12. The labelling device according to claim 11, wherein:

said cover means has an inside surface, said at least a portion of said raised guide surface being disposed on said inside surface, and said at least a portion of said raised guide surface extending a first height away from the inside surface;

said cover means additionally comprises a second guide surface disposed on said inside surface;

said second guide surface being disposed on said cover means substantially concentrically with respect to said pivot point of said cover means and angularly with respect to said raised guide surface; and said second guide surface is inclined from a first end flush with said inside surface of said cover means to a second end in contact with said at least a portion of said raised guide surface, said second end extending away from the inside surface to said second height.

13. The labelling device according to claim 12, wherein said lever is a leaf spring mounted at a second end thereof in said housing.

14. The labelling device according to claim 13, further including:

handle means for gripping said labelling device in a hand, said handle means having a first portion rigidly attached to said housing means and a second portion pivotably mounted in said housing means for movement towards and away from said first portion, said second portion having a rest position away from said first portion;

a lever arm extending from said second portion, said lever arm having a first end adjacent the second portion and a second end disposed away from the second portion;

means for mounting said printing means adjacent said second end of said lever arm;

said second portion being movable towards said first portion for movement of said printing means on said lever arm towards the label to be printed on to print upon the label; and said printing means being configured to push said inking roller along said first path of travel as said printing means moves towards the label to be printed on.

15. The labelling device according to claim 14, further including:

spring means for returning said second portion of said handle means to said rest position and maintaining said second portion of said handle means in said rest position;

label supply means for supplying labels to be printed on;

surface means for holding the label to be printed on during printing of the label;

an applicator roller or applying printed labels to a surface to be labelled;

label feed means for feeding labels to be printed on from said label supply means to said surface means along a label feed path, and feeding printed labels from said surface means to said applicator roller;

drive means for driving said label feed means, said drive means being configured to feed the labels upon movement of said second portion of said handle means away from said first portion of said handle means toward said rest position of said second portion of said handle means;

said label supply means comprising a roll of labels, the labels on said roll of labels being adhered to a peel-away backing, and the peel away backing being configured to move the labels along said label feed path;

said applicator means comprising a first edge for peeling the backing from the labels and an applicator roller for pressing the printed label to the surface to be labelled;

guide rollers for guiding the peel-away backing from said label supply roll to said label feed means;

said label feed path extending from said label supply roll around a first of said guide rollers to said surface means on which the label is printed to said first edge for peeling, around a second of said guide rollers and to said label feed means;

the peel-away backing having a plurality of spaced apart holes along a length thereof;

said drive means comprises a ratchet drive having;

a toothed gear mounted in said housing adjacent said second portion of said handle means, a ratchet lever mounted on said second portion of said handle means, said ratchet lever being configured to engage said toothed gear to move said toothed gear upon said movement of said second portion of said handle means away from said first portion of said handle means, and a resilient member for holding said ratchet lever in engagement with said toothed gear;

said label feed means further comprises wheel means disposed concentric with and connected to said toothed gear for movement of said wheel means with said toothed gear;

said wheel means having a circumference thereabout, with a plurality of spaced apart pin means extending from said wheel means about the circumference of said wheel means; and said plurality of spaced apart pin means being configured for engagement in said plurality of spaced apart holes of the peel-away backing to move the peel-away backing along the label feed path.

16. The labelling device according to claim 7, wherein:

said lever is pivotable from said rest position along said first path of travel to a second position, said pivot pin and said first end of said lever in said second position being disposed outside of said housing for removal of the inking roller therefrom and replacement of the inking roller thereon.

17. The labelling device according to claim 16, wherein said lever is a leaf spring mounted at a second end thereof in said housing.

18. The labelling device according to claim 17, further including:

handle means for gripping said labelling device in a hand, said handle means having a first portion rigidly attached to said housing means and a second portion pivotably mounted in said housing means for movement towards and away from said first portion, said second portion having a rest position away from said first portion;

a lever arm extending from said second portion, said lever arm having a first end adjacent the second portion and a second end disposed away from the second portion;

means for mounting said printing means adjacent said second end of said lever arm;

said second portion being movable towards said first portion for movement of said printing means on said lever arm towards the label to be printed on to print upon the label; and said printing means being configured to push said inking roller along said first path of travel as said printing means moves towards the label to be printed on.

19. The labelling device according to claim 18, further including:

spring means for returning said second portion of said handle means in said rest position and maintaining said second portion of said handle means in said rest position;

label supply means for supplying labels to be printed on;

surface means for holding the label to be printed on during printing of the label;

applicator means for applying printed labels to a surface to be labelled;

label feed means for feeding labels to be printed on from said label supply means to said surface means along a label feed path, and feeding printed labels from said surface means to said applicator roller;

drive means for driving said label feed means, said drive means being configured to feed the labels upon movement of said second portion of said handle means away from said first portion of said handle means toward said rest position of said second portion of said handle means.

20. The labelling device according to claim 19, wherein:

said label supply means comprises a roll of labels, the labels on said roll of labels being adhered to a peel-away backing, and the peel away backing being configured to move the labels along said label feed path;

said applicator means comprises a first edge for peeling the backing from the labels and an applicator roller for pressing the printed label to the surface to be labelled;

said device further comprises guide rollers for guiding the peel-away backing from said label supply roll to said label feed means;

said label feed path extends from said label supply roll around a first of said guide rollers to said surface means on which the label is printed to said first edge for peeling, around a second of said guide rollers and to said label feed means;

the peel-away backing having a plurality of spaced apart holes along a length thereof;

said drive means comprises a ratchet drive having:

a toothed gear mounted in said housing adjacent said second portion of said handle means, a ratchet lever mounted on said second portion of said handle means, said ratchet lever being configured to engage said toothed gear to move said toothed gear upon said movement of said second portion of said handle means away from said first portion of said handle means, and a resilient member for holding said ratchet lever in engagement with said toothed gear;

said label feed means further comprises wheel means disposed concentric with and connected to said toothed gear for movement of said wheel means with said toothed gear;

said wheel means having a circumference thereabout, with a plurality of spaced apart pin means extending from said wheel means about the circumference of said wheel means; and said plurality of spaced apart pin means being configured for engagement in said plurality of spaced apart holes of the peel-away backing to move the peel-away backing along the label feed path.

* * * * *